United States Patent
Irle et al.

(10) Patent No.: US 10,752,728 B2
(45) Date of Patent: Aug. 25, 2020

(54) TDI BASED LOW-VISCOSITY POLYISOCYANATES WITH ISOCYANURATE GROUPS

(71) Applicant: COVESTRO DEUTSCHLAND AG, Leverkusen (DE)

(72) Inventors: Christoph Irle, Cologne (DE); Stefan Groth, Leverkusen (DE); Ruiwen Wu, Leverkusen (DE); Antonio Midolo, Cologne (DE); Robert Maleika, Dusseldorf (DE); Hongchao Li, Shanghai (CN); Hao Liu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/344,967

(22) PCT Filed: Oct. 18, 2017

(86) PCT No.: PCT/EP2017/076609
§ 371 (c)(1),
(2) Date: Apr. 25, 2019

(87) PCT Pub. No.: WO2018/077696
PCT Pub. Date: May 3, 2018

(65) Prior Publication Data
US 2019/0270842 A1    Sep. 5, 2019

(30) Foreign Application Priority Data

Oct. 26, 2016  (WO) ................ PCT/CN2016/103357

(51) Int. Cl.
| | |
|---|---|
| *C08G 18/79* | (2006.01) |
| *C08G 18/42* | (2006.01) |
| *C09D 175/06* | (2006.01) |
| *C08G 18/18* | (2006.01) |
| *C08G 18/02* | (2006.01) |
| *C08G 18/09* | (2006.01) |
| *C09J 175/06* | (2006.01) |

(52) U.S. Cl.
CPC ......... *C08G 18/794* (2013.01); *C08G 18/022* (2013.01); *C08G 18/092* (2013.01); *C08G 18/1825* (2013.01); *C08G 18/1841* (2013.01); *C08G 18/4288* (2013.01); *C09D 175/06* (2013.01); *C09J 175/06* (2013.01); *C08G 2105/02* (2013.01)

(58) Field of Classification Search
CPC .. C08G 18/022; C08G 18/092; C08G 18/794; C08G 18/4288; C08G 2105/02; C08G 18/1825; C08G 18/1841; C09D 175/06; C09J 175/06
See application file for complete search history.

(56) References Cited

U.S. PATENT DOCUMENTS

| | | | |
|---|---|---|---|
| 4,115,373 A | 9/1978 | Henes et al. | |
| 6,992,186 B2 | 1/2006 | Brahm et al. | |
| 2004/0024213 A1 | 2/2004 | Brahm et al. | |
| 2006/0155095 A1* | 7/2006 | Daussin | C08G 18/022 528/45 |
| 2008/0103263 A1* | 5/2008 | Erdem | C08G 18/706 525/410 |

FOREIGN PATENT DOCUMENTS

EP         1378530 A1    1/2004

* cited by examiner

*Primary Examiner* — Rabon A Sergent
(74) *Attorney, Agent, or Firm* — John E. Mrozinski, Jr.

(57) ABSTRACT

The invention relates to a polyisocyanate which is based on tolylene 2,4-diisocyanate, tolylene 2,6-diisocyanate or a mixture of tolylene 2,4- and 2,6-diisocyanate and has isocyanurate groups, wherein the polyisocyanate has
a) a weight average molecular weight of from ≥350 to ≤800 g/mol, determined by means of gel permeation chromatography using a polystyrene standard and tetrahydrofuran as eluent in accordance with DIN 55672-1:2016-03,
b) a polydispersity D of from >1 to ≤1.5, where the polydispersity D is the ratio of weight average and number average molecular weight of the polyisocyanate and the weight average and number average molecular weight are in each case determined by means of gel permeation chromatography using a polystyrene standard and tetrahydrofuran as eluent in accordance with DIN 55672-1:2016-03, and
c) a content of monomeric tolylene diisocyanate of ≤1% by weight, based on the total weight of the polyisocyanate.

9 Claims, No Drawings

TDI BASED LOW-VISCOSITY POLYISOCYANATES WITH ISOCYANURATE GROUPS

The present invention relates to a polyisocyanate which is based on tolylene 2,4-diisocyanate, tolylene 2,6-diisocyanate or a mixture of tolylene 2,4- and 2,6-diisocyanate and has isocyanurate groups. The invention additionally relates to a process for preparing the polyisocyanate, mixtures containing the polyisocyanate and the use thereof in surface coatings and adhesives. Furthermore, the present invention relates to a process for coating or adhesively bonding a substrate and the composite systems obtainable by this process.

Isocyanurates of TDI are prepared by cyclotrimerization using various catalysts. Reaction products of this type have been known for a long time and are described, for example, in DE 951168 B, DE 1013869 A, U.S. Pat. No. 6,936,678 B2, DE 19523657 A1, U.S. Pat. No. 4,255,569 A, EP 2174967 B1 and CN 105001701.

There has long been a desire to prepare the known isocyanurates of TDI firstly with a low viscosity and secondly with a high functionality.

A low viscosity is desired, for example, in order to improve the application behaviour of surface coatings and adhesives. In addition, use of low-viscosity polyisocyanates as crosslinkers of surface coatings and adhesives enables the solvent content of the formulation to be reduced. This means that the emissions of volatile organic compounds from such formulations can be reduced without having an adverse effect on the usability.

Furthermore, it is desirable when using such polyisocyanates as crosslinkers in surface coatings and adhesives for the polyisocyanates to have a high content of isocyanate groups. This further increases the sustainability in the sense of a low content of organic solvents and rapid crosslinking, i.e. high process efficiency.

In addition, it is desirable for the isocyanurates of TDI to have a low content of free diisocyanate. Owing to the toxicological concerns about monomeric TDI, this is an important condition for universal usability in industrially applied surface coatings and adhesives.

The reaction of TDI to form the polyisocyanurate gives, as is known, for example, from DE 951168 B and DE 1013869 A, very highly viscous resins, which makes processing more difficult or makes it necessary to use larger amounts of organic solvents. In addition, polyisocyanates of TDI have a high tendency to crystallize and are only sparingly soluble in organic solvents.

Owing to the high viscosity, even at high temperatures, it is, according to the prior art, not possible to free such resins of monomeric TDI easily by distillation. U.S. Pat. No. 4,255,569 A, EP 2174967 B1 and CN 105001701 describe various ways of carrying out a work-up by distillation in order to reduce the content of monomeric TDI by chemical modification or the addition of distillation auxiliaries. Since such additives reduce the content of functional groups (calculated as proportion by weight of isocyanate groups (NCO groups) based on the total weight of the composition), this is undesirable in principle.

Carrying out the reaction of TDI to form the polyisocyanurate in organic solution has also been described and known for some time, as described, for example, in U.S. Pat. No. 6,936,678 B2, DE 19523657 A1. However, the resins obtained in this way are present in greatly diluted solution and thus lead to high emission of organic solvents during and after application as surface coating or adhesive.

Proceeding from this prior art, it was an object of the present invention to alleviate at least one, preferably more than one, of the abovementioned disadvantages of the prior art. In particular, it was an object of the present invention to provide polyisocyanates which are based on TDI and have isocyanurate groups and which have a high content of free isocyanate groups and at the same time a low content of monomeric diisocyanates and have a low viscosity in dissolved form, allowing a high solids content and securing short drying times.

This object is achieved by a polyisocyanate which is based on tolylene 2,4-diisocyanate, tolylene 2,6-diisocyanate or a mixture of tolylene 2,4- and 2,6-diisocyanate and has isocyanurate groups, wherein the polyisocyanate has a) a weight average molecular weight of from $\geq 350$ to $\leq 800$ g/mol, determined by means of gel permeation chromatography using a polystyrene standard and tetrahydrofuran as eluent in accordance with DIN 55672-1:2016-03, b) a polydispersity D of from $>1$ to $\leq 1.5$, where the polydispersity D is the ratio of weight average and number average molecular weight of the polyisocyanate and the weight average and number average molecular weight are in each case determined by means of gel permeation chromatography using a polystyrene standard and tetrahydrofuran as eluent in accordance with DIN 55672-1:2016-03, and c) a content of monomeric tolylene diisocyanate of $\leq 1\%$ by weight, based on the total weight of the polyisocyanate.

An increased content of isocyanate groups compared to the prior art can be achieved by the polyisocyanate of the invention. In addition, this polyisocyanate makes possible a low viscosity in solutions, so that a higher solids content can be realised and, in addition, the emission of volatile organic solvents can be reduced further.

For the purposes of the present invention, the term tolylene diisocyanate is used as collective term for the isomers tolylene 2,4-diisocyanate, tolylene 2,6-diisocyanate and any mixtures of tolylene 2,4- and 2,6-diisocyanate.

For the purposes of the present invention, the polyisocyanate according to the invention contains oligomers and polymers, which are based on tolylene 2,4-diisocyanate, tolylene 2,6-diisocyanate or a mixture of tolylene 2,4- and 2,6-diisocyanate and have isocyanurate groups, and can comprise $\leq 1\%$ by weight, based on the total weight of the polyisocyanate, of monomeric tolylene diisocyanate or, in case the below mentioned compounds having isocyanate groups are concomitantly used, can comprise a total amount of any residual monomeric monoisocyanates, diisocyanates and triisocyanates of $\leq 1\%$ by weight, based on the total weight of the polyisocyanate.

For the purposes of the present invention, the expression "based on tolylene 2,4-diisocyanate, tolylene 2,6-diisocyanate or a mixture of tolylene 2,4- and 2,6-diisocyanate" means that these diisocyanates and mixtures thereof make up $\geq 60\%$ by weight, preferably $\geq 90\%$ by weight, particularly preferably 95% by weight and very particularly preferably 100% by weight, of the total compounds bearing isocyanate groups which are used.

The balance to 100% by weight can consist of any other compounds having isocyanate groups, for example monoisocyanates having aliphatically, cycloaliphatically, araliphatically or aromatically bound isocyanate groups, e.g. stearyl isocyanate, naphthyl isocyanate, diisocyanates having aliphatically, cycloaliphatically, araliphatically and/or aromatically bound isocyanate groups, e.g. 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane (IMCI), bis(isocyanatomethyl)norbornane, 2,4'- and 4,4'-diisocyanatodiphenylmethane and higher homologs, 1,5-diisocyanatortapinhalene, dipropylene glycol diisocyanate, triisocyanates and/or higher-functionality isocyanates such as 4-isocyanatomethyloctane 1,8-diisocyanate (nonane triisocyanate), undecane 1,6,11-triisocyanate or any mixtures of such isocyanate compounds and modified isocyanate compounds which are derived from the abovementioned diisocyanates and triisocyanates and are prepared by oligomerization reactions, for example trimerization. Preferred compounds having isocyanate groups are for the present purposes 1,5-diisocyanatopentane (PDI) and/or 1,6-diisocyanatohexane (HDI) and/or modified isocyanate compounds which are derived from the diisocyanates mentioned above as preferred and are prepared by oligomerization reactions, for example trimerization. If compounds mentioned above which have isocyanate groups and are different from TDI are concomitantly used, the total amount of any monomeric monoisocyanates, diisocyanates and triisocyanates still present is ≤1% by weight, based on the total weight of the polyisocyanate of the invention.

The number average molecular weights Mn mentioned in the present document and the weight average molecular weights Mw mentioned in the present document were determined by means of gel permeation chromatography (GPC) using a polystyrene standard and tetrahydrofuran as eluent in accordance with DIN 55672-1:2016-03.

For the purposes of the invention, the references to "comprising", "containing", etc., preferably mean "consisting essentially of" and very particularly preferably "consisting of".

In a first preferred embodiment, the weight average molecular weight is from ≥500 to ≤750 g/mol. The proportion of compounds made up of three monomer units connected via an isocyanurate group is thus increased further, which leads to an increased content of isocyanate groups in the polyisocyanate of the invention. This gives the further advantage that the polyisocyanate is a still more efficient crosslinker. A very high proportion by weight of functional groups per molecule leads to faster crosslinking when the compound is used as crosslinker.

In a further preferred embodiment, the polydispersity D is from ≥1.0005 to ≤1.3 and preferably from ≥1.005 to ≤1.15. This gives the further advantage that the polyisocyanate has a particularly low viscosity but allows a surprisingly high crosslinking rate.

In a further preferred embodiment, the content of monomeric tolylene diisocyanate is ≤0.5% by weight, preferably ≤0.3% by weight and particularly preferably ≤0.2% by weight, based on the total weight of the polyisocyanate. This gives the further advantage that the polyisocyanate of the invention can be used in an even broader range of applications since occupational hygiene, in particular in manual applications, is improved still further. If compounds which have isocyanate groups and are different from TDI are concomitantly used, the total amount of any monomeric monoisocyanates, diisocyanates and triisocyanates, including TDI, still present is ≤0.5% by weight, preferably ≤0.3% by weight and particularly preferably ≤0.2% by weight, based on the total weight of the polyisocyanate of the invention. The content of monomeric tolylene diisocyanate and the total amount of any monomeric monoisocyanates, diisocyanates and triisocyanates, including TDI, still present are determined gas-chromatographically using an internal standard in accordance with DIN EN ISO 10283:2007-11.

In a further preferred embodiment, the polyisocyanate d) has a content of allophanate and urethane groups of from ≥0 to ≤0.5% by weight, preferably from ≥0 to ≤0.1% by weight and particularly preferably from ≥0 to ≤0.05% by weight, based on the total weight of the polyisocyanate. This leads to the further advantage that the crosslinking density is improved since no isocyanate groups have been reacted with hydroxyl groups and would then no longer be available for crosslinking in the final use. This effect is particularly pronounced in the case of allophanate groups since a hydroxyl group is in this case reacted with a total of two isocyanate groups. The content of allophanate and urethane groups is determined by NMR spectroscopic analysis of the polyisocyanate, preferably by $^{13}$C-NMR spectroscopy.

It has surprisingly been found in the context of the present invention that the opinion prevailing in the prior art, as mentioned at the outset, that modification with allophanate and/or urethane groups is necessary to be able to handle polyisocyanates which are based on TDI and have isocyanurate groups efficiently in process engineering terms when no other additives, for example distillation auxiliaries, are used is not pertinent.

In addition, urethane groups can under some conditions tend to undergo transurethanization, which can lead to an undesirable shift in the molecular weight distribution.

For the present purposes, allophanate groups are the following structural units:

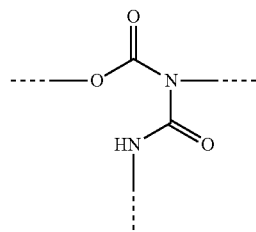

allophanate group ($C_2HN_2O_3$)

For the present purposes, urethane groups are the following structural units:

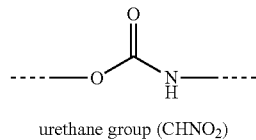

urethane group ($CHNO_2$)

In a further preferred embodiment, the polyisocyanate of the invention is based on a mixture of tolylene 2,4-diisocyanate and tolylene 2,6-diisocyanate which are present in a weight ratio of from 3:2 to 9.5:0.5 and preferably from 7:3 to 9:1. This gives the further advantage that an appropriate balance between selectivity of the differently reactive isocyanate groups in 2,4-TDI and increasing the crystallization stability by means of at least a small proportion of 2,6-TDI is obtained.

Both tolylene 2,4- and 2,6-diisocyanate and also mixtures thereof are generally commercially available. They can be prepared by known methods, for example by phosgenation of the corresponding toluenediamine (TDA) in the liquid phase or the gas phase. Particular preference is given to tolylene diisocyanates which are prepared by gas-phase phosgenation of TDA since such a process is particularly efficient.

In a further preferred embodiment, the polyisocyanate of the invention has a content of isocyanate groups of from $\geq 20$ to $\leq 25\%$ by weight, preferably from $\geq 22$ to $\leq 24\%$ by weight, based on the total weight of the polyisocyanate. The content of isocyanate groups is determined titrimetrically in accordance with DIN EN ISO 11909:2007-05.

The invention further provides compositions containing at least one polyisocyanate according to the invention. In a further preferred embodiment, the composition comprises >70% by weight, preferably $\geq 90\%$ by weight, particularly preferably >99% by weight, very particularly preferably $\geq 99.5\%$ by weight, and in particular consists of 100% by weight, of the polyisocyanate of the invention.

As described at the outset, the general formation of isocyanurate groups starting out from TDI is already known. However, either a reaction in solution is carried out, in which case no sufficiently narrow molecular weight distribution can be achieved at a simultaneously satisfactorily low content of unreacted tolylene diisocyanate, or a reaction is carried out in the absence of solvent but then usually in the presence of hydroxyl-containing compounds which reduce the proportion of the isocyanate groups which are later available for crosslinking. It was therefore likewise an object of the present invention to provide a process by means of which the polyisocyanates of the invention can be prepared reliably and efficiently and which does not suffer from the disadvantages of the prior art.

Such a process is thus also provided by the present invention. The process of the invention for preparing a polyisocyanate according to the invention comprises the steps (i) reaction of tolylene diisocyanate to form isocyanurate groups in the presence of at least one catalyst, (ii) stopping of the reaction at a content of isocyanate groups of from $\geq 30$ to $\leq 48.3\%$ by weight, preferably from $\geq 34$ to $\leq 46\%$ by weight and particularly preferably from $\geq 38$ to $\leq 42\%$ by weight by deactivation of the catalyst, preferably by thermal decomposition of the catalyst or by addition of at least one catalyst poison and particularly preferably by addition of at least one catalyst poison, and (iii) removal of the unreacted tolylene diisocyanate, where the steps (i) to (iii) are carried out in the presence of from $\geq 0$ to <1% by weight of liquid distillation auxiliaries which are inert under distillation conditions and have a boiling point at least 50° C. above that of the isocyanurate group-free monomeric isocyanate and/or from $\geq 0$ to <1% by weight, based on the total weight of the compounds used in step (i) and (ii), of compounds which have one or more hydroxyl groups. If various monomeric isocyanates are used, the 50° C. relates to the boiling point of the isocyanate used which has the highest boiling point. The content of isocyanate groups is determined as indicated above.

Preference is given to such distillation auxiliaries being present in amounts of from $\geq 0$ to $\leq 0.5\%$ by weight, preferably from $\geq 0$ to $\leq 0.25\%$ by weight and particularly preferably from $\geq 0$ to $\leq 0.1\%$ by weight, based on the total weight of the compounds used in step (i) and (ii), and/or the compounds having one or more hydroxyl groups being present in amounts of from $\geq 0$ to $\leq 0.8\%$ by weight, preferably from $\geq 0$ to $\leq 0.5\%$ by weight, particularly preferably from $\geq 0$ to $\leq 0.1\%$ by weight, based on the total weight of the compounds used in step (i) and (ii). Any distillation auxiliaries present in these amounts and/or any compounds having one or more hydroxyl groups which are present in these amounts have no adverse effect on the process of the invention. However, very particular preference is given to no distillation auxiliaries and/or no compounds having one or more hydroxyl groups being present in steps (i) to (iii) of the process of the invention, with the exception of the aromatic hydroxyl groups which are mentioned in the following as catalyst constituent and may optionally be present.

If solvents which are inert towards isocyanate groups are present in steps (i) to (iii) in the process of the invention, preference is given to such solvents being able to be present in steps (i) to (iii) in amounts of from $\geq 0$ to $\leq 3\%$ by weight, preferably from $\geq 0$ to $\leq 1\%$ by weight and particularly preferably from $\geq 0$ to $\leq 0.05\%$ by weight, based on the total weight of the compounds used in step (i) and (ii).

Any above-defined compounds having isocyanate groups which are to be concomitantly used can be added in step (i), with the above-defined minimum % by weight of tolylene diisocyanate also applying here. Particular preference is likewise given to only tolylene diisocyanate being used in step (i).

As catalysts for the formation of isocyanurate groups, hereinafter also referred to as trimerization catalysts, it is in principle possible to use all known catalysts of the prior art, for example phosphines, alkali metal salts, alkali metal alkoxides, tertiary amines, fluorides, hydrogendifluorides or hydrogenpolyfluorides. Preference is given to using catalysts which have N,N-dialkylaminomethyl groups bound to the aromatic and phenolic OH groups (alkyl: independently alkyl chain or alkylene chain having up to 18 carbon atoms, which are optionally separated by oxygen or sulphur). These groups can be distributed over a plurality of molecules or be positioned on one or more benzenic aromatics. Particular preference is given to using catalysts which contain both hydroxyl groups and dialkylaminomethyl groups in one molecule. Very particular preference is given to using catalysts whose dialkylaminomethyl groups (alkyl=$C_1$ to $C_3$ chain) are positioned in the ortho position relative to aromatic hydroxyl groups. As examples, mention may be made of the following Mannich bases which are obtained, for example, on the basis of phenol, p-isononylphenol or bisphenol A, for example by reacting 188 parts by weight of phenol with 720 parts of a 25% strength aqueous dimethylamine solution and 425 parts by weight of 40% strength formaldehyde solution by heating to 80° C. for two hours, separating of the aqueous phases and distilling the organic phase at 90° C./10 torr as described in DE-A 2 452 531 9.

The reaction in step (i) is generally carried out at temperatures in the range from 20 to 120° C., preferably from 40 to 100° C. and particularly preferably from 60 to 90° C.

The catalysts are used in step (i) either as pure substance or as solution, optionally in a plurality of small portions, with the amount being able to be varied over a wide range. The total amount of catalyst used is preferably from $\geq 0.001$ to $\leq 2.0\%$ by weight, preferably from $\geq 0.003$ to $\leq 0.5\%$ by weight and particularly preferably from $\geq 0.005$ to $\leq 0.05\%$ by weight, based on the total weight of the compounds used in step (i) and (ii).

The stopping of the reaction in step (ii) is effected by deactivation of the catalyst. This can be achieved by different methods, preferably by thermal decomposition of the catalyst or by addition of at least one catalyst poison and particularly preferably by addition of at least one catalyst poison, with, for example, sulphur (in the case of the use of phosphines as catalysts) or alkylating agents such as methyl toluenesulphonate (in the case of the preferred use of Mannich bases as catalysts) or else acylating agents such as benzoyl chloride or isophthaloyl dichloride being able to be used as catalyst poisons. Also preferred, acidic esters of phosphoric acid, e.g. dibutyl phosphate, are used.

The amount of the catalyst poison to be used is selected according to the amount of catalyst used, so that the catalyst is deactivated. Preference is given to using a total subequimolar amount of the catalyst poison based on equivalents of Lewis bases of the catalysts. From >20 to <200%, based on the equivalents of Lewis base of the catalyst used, can be sufficient for complete deactivation of the catalyst.

The removal of the unreacted tolylene diisocyanate in step (iii) can be carried out by any methods, but is preferably carried out by means of at least one thermal separation process, which can have one or more stages. Suitable thermal separation processes are, for example, distillations under reduced pressure by means of a thin film evaporator and/or falling film evaporator. Pressures in the range of 0.1-20 mbar and temperatures of 140-220° C. are generally suitable for the removal of TDI.

In a preferred embodiment, the process of the invention comprises a further step
(iv) dilution of the polyisocyanate of the invention in at least one solvent so that the solids content is from ≥15 to ≤80% by weight, preferably from ≥20 to ≤75% by weight, particularly preferably from ≥25 to ≤73% by weight and very particularly preferably from ≥55 to ≤70% by weight.

The solids content, in this application also referred to as non volatile content, was determined in accordance with DIN EN ISO 3251 using a drying temperature and time of 2 hours at 120° C. and a test dish diameter of 75 mm and a weighed-in quantity of 2.00 g+/−0.02.

As solvents, it is possible to use diluents and solvents customary in polyurethane chemistry, for example toluene, xylene, cyclohexane, butyl acetate, ethyl acetate, ethyl glycol acetate, pentyl acetate, hexyl acetate, methoxypropyl acetate, tetrahydrofuran, dioxane, acetone, N-methylpyrrolidone, methyl ethyl ketone, petroleum spirit, relatively highly substituted aromatics as are commercially available, for example, under the name Solvent Naphtha®, Solvesso®, Shellsol®, Isopar®, Nappar® and Diasol®, homologues of benzene, tetralin, decalin and alkanes having more than 6 carbon atoms, conventional plasticizers such as phthalates, sulphonic esters and phosphoric esters and also mixtures of such diluents and solvents.

Further suitable solvents are polyisocyanates based on aliphatic diisocyanates, as are described, for example, in DE-A 4 428 107. This makes it possible to obtain diluted low-monomer TDI trimers which contain no or less volatile solvents and diluents.

In a further preferred embodiment, the process of the invention comprises a further step
(v) addition of at least one component having isocyanate groups, preferably at least one polyisocyanurate composition based on tolylene diisocyanate, and optionally further auxiliaries and additives.

This gives the further advantage that the physical and chemical properties of mixtures containing at least one polyisocyanate according to the invention can be set in a targeted manner.

Suitable auxiliaries and additives are, for example, the customary wetting agents, levelling agents, skin prevention agents, antifoams, solvents, matting agents such as silica, aluminium silicates and high-boiling waxes, viscosity-regulating substances, pigments, dyes, UV absorbers, stabilizers against thermal or oxidative degradation.

Polyisocyanates which have been prepared by or are able to be prepared by the above-described process of the invention comprising at least the steps (i), (ii) and (iii) are also provided by the invention since it has surprisingly been found that such a way of carrying out the process leads to polyisocyanates which have isocyanurate groups and have an increased content of isocyanate groups compared to the prior art and are not contaminated with undesirable compounds and are nevertheless simple to prepare and to purify in process engineering terms.

The invention thus also provides a mixture which has isocyanate groups and contains from ≥15 to ≤40% by weight, preferably from ≥20 to ≤30% by weight, of at least one polyisocyanate according to the invention, preferably at least one polyisocyanate according to the invention in its abovementioned preferred, particularly preferred and/or very particularly preferred embodiments, from ≥5 to ≤20% by weight, preferably from ≥7 to ≤15% by weight, of at least one polyisocyanate based on tolylene diisocyanate, preferably at least one polyisocyanurate which is based on tolylene diisocyanate and has isocyanate groups and has a polydispersity D of ≥1.5, preferably ≥2.0, and from ≥40 to ≤75% by weight, preferably from ≥55 to ≤70% by weight, of at least one solvent, where the sum of the % by weight can, even in the case of the optional presence of further compounds, be not greater than 100% and particularly preferably adds up to 100%.

The preferred polyisocyanurate which is based on TDI and has isocyanate groups and a polydispersity D of >1.5, preferably >2.0, can be obtained, for example, by processes known from, for example, EP 1378530 A 1 or DE 19523657 A1 by means of trimerization of TDI, i.e. formation of isocyanurate groups, in a solvent through to high conversions.

It is also preferred that the mixture according to the invention is a physical mixture of at least one polyisocyanate according to the invention which is based on tolylene diisocyanate and has isocyanate groups and at least one polyisocyanurate which has isocyanate groups and is different from the polyisocyanate of the invention and is based on TDI in the % by weight indicated above. In this mixture, the difference between the ratios of isocyanurate trimer (derived from three molecules of TDI) to isocyanurate pentamer (derived from five molecules of TDI) and isocyanurate pentamer (derived from five molecules of TDI) to isocyanurate heptamer (derived from seven molecules of TDI) is >0.4, preferably >0.7 and particularly preferably >1.0. The contents of isocyanurate trimer, isocyanurate pentamer and isocyanurate heptamer are determined by means of gel permeation chromatography using a polystyrene standard and tetrahydrofuran as eluent in accordance with DIN 55672-1:2016-03.

The mixture according to the invention has the further advantage that the polyisocyanate of the invention offers an optimal mixture of fast crosslinking and low viscosity. The mixture according to the invention preferably has a content of isocyanate groups of from ≥3 to ≤15% by weight and preferably from ≥5 to ≤10% by weight, based on the total weight of the mixture according to the invention. The content of socyanate groups is determined titrimetrically in accordance with DIN EN ISO 11909:2007-05.

In a further preferred embodiment, the mixture according to the invention has a viscosity of from ≥1 to ≤500 mPas at 23° C., preferably from ≥2 to ≤400 mPas at 23° C., measured in accordance with DIN EN ISO 3219:1994-10 using a cone/plate measuring instrument. This gives the further advantage that such mixtures can be formulated to produce readily applicable coating compositions or adhesives.

Both the polyisocyanate of the invention and the mixture of the invention can be used as crosslinker in an adhesive or a coating composition. The two abovementioned subjects are therefore likewise part of the invention. When the polyisocyanate of the invention is used as crosslinker, it is preferably diluted with any desired amount of one of the abovementioned solvents in order to set the desired viscosity.

The polyisocyanates prepared by the process of the invention are preferably used for producing adhesives or coating materials which can be cured under the action of moisture. They can likewise be used in the production of bonding agents, printing inks and polyurethane mouldings. They are particularly preferably used as crosslinkers in two-component systems containing compounds which are reactive towards isocyanate groups and are known per se. These include, for example, hydroxy-functional polyethers, polyesters, polyamides, polycarbonates, polyacrylates, polybutadienes and mixed types of the hydroxy-functional polymers mentioned. Low molecular weight diols and polyols, dimeric and trimeric fatty alcohols and also amino-functional compounds can also be used in two-component systems. In addition, cyclohexanone-formaldehyde condensates, for example in castor oil, are suitable. However, hydroxyl-containing polyesters are particularly preferred. Apart from the process products according to the invention, other auxiliaries and additives such as the customary wetting agents, levelling agents, skin prevention agents, antifoams, bonding agents, solvents, matting agents such as silica, aluminium silicates and high-boiling waxes, viscosity-regulating substances, pigments, dyes, UV absorbers, stabilizers against thermal or oxidative degradation can be used in the coatings or adhesive bonds.

The coating compositions can be used in the form of clear varnishes or in the form of pigmented paints. The coating materials or adhesives obtained can be used for coating or adhesively bonding any substrates such as natural or synthetic fibre materials, preferably wood, plastics, leather, paper, textiles, glass, ceramic, plaster or render, masonry, metals or concrete and particularly preferably paper or leather. They can be applied by conventional application methods such as spraying, painting, flooding, casting, dipping, rolling.

The invention further provides a process for producing a composite system, which comprises the following steps:

A) mixing of at least one polyisocyanate according to the invention or at least one mixture according to the invention with at least one compound which is reactive toward isocyanate groups, preferably with at least one polyester polyol, B) application of the mixture to at least one substrate and C) curing of the mixture applied to the substrate.

If the polyisocyanate of the invention is used in step A) of the process of the invention, it is preferably diluted with a solvent. In this way, the viscosity preferred for the respective application can be set over a wide range. A composite system which has been produced or is able to be produced by the process of the invention comprising the steps A), B) and C) is therefore also provided by the invention.

The invention will be illustrated below with the aid of examples and comparative examples, but without being restricted thereto.

EXAMPLES

All percentages are, unless indicated otherwise, by weight.

The determination of the NCO contents was carried out titrimetrically in accordance with DIN EN ISO 11909:2007-05.

The residual monomer contents were determined gas-chromatographically using an internal standard in accordance with DIN EN ISO 10283:2007-11.

All viscosity measurements were carried out in accordance with DIN EN ISO 3219:1994-10 using a cone/plate measuring instrument. Unless indicated otherwise, measurements were carried out at a temperature of 23° C.

The distribution of the oligomers was determined by gel permeation chromatography in accordance with DIN 55672-1:2016-03 using polystyrene as standard and tetrahydrofuran as eluent.

The non volatile content was determined in accordance with DIN EN ISO 3251 using a drying temperature and time of 2 hours at 120° C. and a test dish diameter of 75 mm and a weighed-in quantity of 2.00 g+/−0.02.

The drying properties of the coating systems were determined in accordance with DIN 53 150:2002-09.

Polyisocyanate I (Inventive)

2040 parts of a mixture of tolylene diisocyanate, containing approx. 80% tolylene 2,4-diisocyanate and approx. 20% tolylene 2,6-diisocyanate, were added to a 2 L flask with stirrer equipped with a reflux condenser, dropping funnel and nitrogen inlet. The mixture was heated to 80° C. Then, 0.42 parts by weight of a Mannich base (phenol/formaldehyde/dimethylamine, 77% in xylene) was added during one hour. As soon as the free isocyanate group content was 47.4%, 0.96 parts, by weight, of methyl p-toluene sulfonate were added to stop the reaction.

The excess monomeric isocyanate was then removed by a combination of short path distillation and thin-film evaporator at a pressure of 0.11 mbar and a temperature of 145° C. (short path distillation) and 200° C. (for thin film evaporator). 214 parts of solid transparent product with glassy consistency were obtained after the distillation. The resin isolated contained 0.28%, by weight, of free monomeric tolylene diisocyanate and 85.3%, by weight, of tris-(isocyanatotoluene)-isocyanurate, a number average of molecular weight of 527 g/mol and a polydispersity D of 1.08.

The resin was dissolved in ethyl acetate to get a solution with the following characteristics:

Isocyanate group content: 15.0%

Non volatile content: 65.2%

Viscosity: 179 mPas

Polyisocyanate 2 (Inventive)

1500 parts of a mixture of tolylene diisocyanate, containing approx. 80% tolylene 2,4-diisocyanate and approx. 20% tolylene 2,6-diisocyanate, were added to a 2l1 flask with stirrer equipped with a reflux condenser, dropping funnel and nitrogen inlet. The mixture was heated to 80° C. Then, 0.52 parts, by weight, of a Mannich base catalyst (bisphenol A/formaldehyde/dimethylamine, 25% in n-butyl acetate/xylene 19:56) were added in two hours. As soon as the free isocyanate group content was 40.4%, 1.0 part, by weight, of dibutyl phosphate was added to stop the reaction.

The excess monomeric isocyanate was then removed by a combination of short path distillation and thin-film evaporator at a pressure of 0.05 mbar and a temperature of 180° C. (short path distillation) and consecutively 180° C. (thin film evaporator). 370 parts of a solid transparent product with glassy consistency were obtained after the distillation. The resin isolated contained 0.18%, by weight, of free monomeric tolylene diisocyanate and 78.9%, by weight, of tris-(isocyanatotoluene)-isocyanurate, a number average of molecular weight of 533 g/mol and a polydispersity D of 1.09.

The resin was dissolved in ethyl acetate to get a solution with the following characteristics:

Isocyanate group content: 15.1%

Non volatile content: 64.6%

Viscosity γ 291 mPas

Polyisocyanate 3 (Inventive)

1700 parts of a mixture of tolylene diisocyanate, containing approx. 80% tolylene 2,4-diisocyanate and approx. 20% tolylene 2,6-diisocyanate, were added to a 2 L flask with stirrer equipped with a reflux condenser, dropping funnel and nitrogen inlet. The mixture was heated to 100° C. Then, 0.64 parts, by weight of a Mannich base catalyst (based on phenol/formaldehyde/dimethylamine, 77% in Xylene) were added in 2.5 hours. When the free isocyanate group content was 34.6%, 1.2 parts, by weight, of methyl p-toluenesulfonate were added to stop the reaction.

The excess monomeric isocyanate was then removed by a thin-film evaporator at a pressure of 0.05 mbar using a short path evaporator (160° C.) and consecutively, a thin film evaporator (214° C.). 542 parts of solid transparent product with glassy consistency were obtained after distillation. The resin isolated contained 0.12%, by weight, of free monomeric tolylene diisocyanate and 60.8%, by weight, of tris-(isocyanatotoluene)-isocyanurate, a number average molecular weight of 596 g/mol and a polydispersity D of 1.20.

The resin was dissolved in ethyl acetate to get a solution with the following characteristics:

Isocyanate group content: 13.7%

Non volatile content: 64.8%

Viscosity: 444 mPas

Polyisocyanate 4 (Comparison)

1575 parts of a mixture of tolylene diisocyanate, containing approx. 80% tolylene 2,4-diisocyanate and approx. 20% tolylene 2,6-diisocyanate and 750 parts, by weight, of butyl acetate, were added to a 4 L, flask with stirrer equipped with a reflux condenser, dropping funnel and nitrogen inlet. The mixture was heated to 88° C. Then, 168 parts, by weight, of 1-dodecanot, were added in 55 minutes. As soon as the mixture reached a content of free isocyanate groups of 28.97%, by weight, 1055 parts of butyl acetate were added. Temperature was decreased to 45° C. Then, 17.5 parts, by weight, of a Mannich base catalyst (bisphenol A/formaldehyde/dimethylamine, 25% in n-butyl acetate/xylene 19:56) were added during 23.5 hours. When the isocyanate group content had reached 7.56%, 10.6 parts, by weight, of methyl p-toluenesulfonate were added to stop the reaction.

The resin isolated contains 13.23%, by weight, of tris-(isocyanatotoluene)-isocyanurate and had a molecular weight (number average) of 1160 g/mol and a polydispersity D of 1.62.

The solution containing the resin had the following characteristics:

Isocyanate group content: 7.6%

Non volatile content: 49.8%

Viscosity: 164 mPas

Polyisocyanate 5 (Comparison)

1700 parts of a mixture of tolylene diisocyanate, containing approx. 80% tolylene 2,4-diisocyanate and approx. 20% tolylene 2,6-diisocyanate, were added to a 2 L flask with stirrer equipped with a reflux condenser, dropping funnel and nitrogen inlet. The mixture was heated to 85° C. Then, 170 parts, by weight, of polyol (1,1,1-Tris(hydroxymethyl) propane/diethylene glycol=65:35 by weight) were added in 49 minutes. After 55 minutes, the free isocyanate group content reached 35.86%, indicating full conversion of the isocyanate—polyol reaction.

Excess monomeric isocyanate was then removed by distillation at a pressure of 0.01 mbar, using a short path evaporator (132° C.) and consecutively, a thin film evaporator (127° C.). 735 parts of solid transparent product with consistency were obtained. The isolated resin had a number average molecular weight of 750 g/mol and a polydispersity D of 1.14. It contained 0.20% of free monomeric tolylene diisocyanate. The resin was dissolved in ethyl acetate to a solution with the following characteristics:

Isocyanate group content: 14.1%

Non volatile content: 74.4%

Viscosity: 772 mPas

Example 1

Drying Speed Test

In these application testings, Desmophen 1300 X (Covestro), a fatty acid modified polyester polyol with an OH content of 3.2%, by weight, and a non volatile content of approx. 75%, was used in the formulations. The ratio of isocyanate groups to hydroxyl groups was 0.8 and the solid content was 40%, by weight, for all formulations.

Ingredients were mixed together homogenously. Then each mixture was immediately applied onto transparent glass plates using a film applicator (thickness of wet film was 120 pn) and was allowed to dry at ambient temperature (23.5° C.) and a humidity of 50%. All testing were based on DIN 53 150:2002-09.

Formulation 1

| Ingredient | By weight % |
| --- | --- |
| Polyisocyanate 2 | 16.5 |
| Desmophen 1300 X | 39.1 |
| Butyl Acetate | 44.4 |

Formulation 2 (comparison)

| Ingredient | By weight % |
| --- | --- |
| Polyisocyanate 5 | 16.9 |
| Desmophen 1300 X | 36.4 |
| Butyl Acetate | 46.7 |

The results are shown in the following table 1:

TABLE 1

| Formulation | Formulation Viscosity (T4 cup) | T1 (dust dry) | T3 | T4 (full cure) |
|---|---|---|---|---|
| 1 | 13.1 s | 7 min 19 s | 22 min 32 s | 30 min 50 s |
| 2 | 12.8 s | 10 min 21 s | 3 h 47 min | 5 h 1 min |

These drying speed tests reveal that the inventive Polyisocyanates can be used in low viscosity formulations, similar to known Urethane-polyisocyanates (comparative Polyisocyanate 5). When using inventive Polyisocyanate 2 (Formulation 1), drying is significantly faster, leading e. g. to productivity gain in industrial coatings processes.

Example 2

Drying Speed Test

The drying speed test are carried out in the same way as Example 1, except that the solid content is set to 50% by weight for following formulations:

Formulation 3

| Ingredient | By weight % |
|---|---|
| Polyisocyanate 2 | 20.6 |
| Desmophen 1300 X | 48.9 |
| Butyl Acetate | 30.5 |

Formulation 4

| Ingredient | By weight % |
|---|---|
| Blend of Polyisocyanate 2 and Polyisocyanate 4 (2/1, by weight) | 24.4 |
| Desmophen 1300 X | 47.2 |
| Butyl Acetate | 28.4 |

Formulation 5 (Comparison)

| Ingredient | By weight % |
|---|---|
| Polyisocyanate 4 | 36.2 |
| Desmophen 1300 X | 42.1 |
| Butyl Acetate | 21.7 |

The results are shown in the following table 2:

TABLE 2

| Formulation | Formulation Viscosity (T4 cup) | T1 (dust dry) | T3 | T4 (full cure) |
|---|---|---|---|---|
| 3 | 18.8 s | 6 min 47 s | 21 min 28 s | 29 min 12 s |
| 4 | 20.4 s | 6 min 15 s | 20 min 35 s | 26 min 1 s |
| 5 | 31.3 s | 6 min 15 s | 13 min 37 s | 17 min |

The results show that the polyisocyanates according to this invention reveal the most efficient properties, combining low viscosity and short drying cycles.

The invention claimed is:

1. Polyisocyanate which is based on tolylene 2,4-diisocyanate, tolylene 2,6-diisocyanate or a mixture of tolylene 2,4- and 2,6-diisocyanate and has isocyanurate groups, wherein the polyisocyanate has
    a) a weight average molecular weight of from $\geq 350$ to $\leq 800$ g/mol, determined by means of gel permeation chromatography using a polystyrene standard and tetrahydrofuran as eluent in accordance with DIN 55672-1:2016-03,
    b) a polydispersity D of from $>1$ to $\leq 1.5$, where the polydispersity D is the ratio of weight average and number average molecular weight of the polyisocyanate and the weight average and number average molecular weight are in each case determined by means of gel permeation chromatography using a polystyrene standard and tetrahydrofuran as eluent in accordance with DIN 55672-1:2016-03, and
    c) a content of monomeric tolylene diisocyanate of $\leq 1\%$ by weight, based on the total weight of the polyisocyanate.

2. Polyisocyanate according to claim 1, wherein the weight average molecular weight is from $\geq 500$ to $\leq 750$ g/mol.

3. Polyisocyanate according to claim 1, wherein the polydispersity D is from $\geq 1.0005$ to $\leq 1.3$.

4. Polyisocyanate according to claim 1, wherein the content of monomeric tolylene diisocyanate is $\leq 0.5\%$ by weight.

5. Polyisocyanate according to claim 1, wherein the polyisocyanate has
    d) a content of allophanate and urethane groups of from $\geq 0$ to $\leq 0.5\%$ by weight, based on the total weight of the polyisocyanate.

6. Polyisocyanate according to claim 1, wherein the mixture of tolylene 2,4- and 2,6-diisocyanate has a weight ratio of from 3:2 to 9.5:0.5.

7. Polyisocyanate according to claim 1, wherein the polyisocyanate has a content of isocyanate groups of from $\geq 20$ to $\leq 25\%$ by weight, based on the total weight of the polyisocyanate.

8. Mixture which has isocyanate groups and contains
    from $\geq 15$ to $\leq 40\%$ by weight, of at least one polyisocyanate according to claim 1,
    from $\geq 5$ to $\leq 20\%$ by weight, of at least one polyisocyanate based on tolylene diisocyanate and
    from $\geq 40$ to $\leq 75\%$ by weight, of at least one solvent, where the sum of the % by weight, even in the case of the optional presence of further compounds, is not greater than 100%.

9. Mixture according to claim 8, wherein the mixture has a viscosity of from $\geq 1$ to $<500$ mPas at 23° C., measured in accordance with DIN EN ISO 3219:1994-10 using a cone/plate measuring instrument.

\* \* \* \* \*